May 8, 1962     H. T. ROBINSON ET AL     3,033,078

MAGAZINE ACCESSORY FOR AN AUTOMATIC SLIDE PROJECTOR

Filed Nov. 2, 1959

HERBERT T. ROBINSON
MATTHEW DI PIETRO
INVENTORS

BY

ATTORNEYS

United States Patent Office 3,033,078
Patented May 8, 1962

3,033,078
MAGAZINE ACCESSORY FOR AN AUTOMATIC SLIDE PROJECTOR
Herbert T. Robinson and Matthew Di Pietro, Rochester, N.Y., assignors to Eastman Kodak Company, Rochester, N.Y., a corporation of New Jersey
Filed Nov. 2, 1959, Ser. No. 850,212
10 Claims. (Cl. 88—28)

This invention relates generally to a magazine accessory device for automatic slide projectors, and more specifically to an actuating member mounted on a magazine that is only partially filled with slides and adapted to actuate a switch to initiate operation of the projector for automatically returning the magazine to its original starting position.

In automatic slide projectors of the type on the market today, if the operator has projected all of the slides in a slide magazine and desires to reproject the same slides, it is necessary for the operator to either remove the slide magazine from the projector and reinsert it into the projector in its original starting position, or he must manually return the magazine along its track back to its original starting position. This entails considerable inconvenience to the operator and further is disadvantageous in that the operator may damage some of the working parts of the projector by manually manipulating the magazine, particularly if the magazine should become jammed and the operator applies an excessive force to the magazine in an attempt to free it. Some of the automatic projectors will automatically return the slide magazine to its original starting position, but will reproject all of the slides as the magazine is being returned. This is extremely time consuming, particularly if the magazine holds 36 or 40 slides, and is particularly disconcerting to the audience before whom the slides are being projected.

Most of these objectionable features have been eliminated by an improved automatic slide projector of the type disclosed and described in U.S. patent application Serial No. 696,516 by Herbert T. Robinson, one of the coinventors of the present invention. This slide projector has been further improved by incorporating mechanism therein actuable by the slide magazine for automatically returning the magazine to its original starting position after all of the slides have been projected. This improvement has been made the subject of a U.S. patent application Serial No. 850,213 filed November 2, 1959, by Herbert T. Robinson. One objectionable feature of this improved slide projector is that the magazine must be advanced through all of its slide compartments before the projector is actuated to return the slide magazine. This is extremely inconvenient in all of those instances where not all of the slide magazine compartments are filled with slides.

Accordingly, applicants have invented an accessory device for the slide magazine which is adapted to initiate operation of the projector for automatically returning the magazine as soon as the last slide therein has been projected and returned. In other words, it is now possible for the operator by using this accessory device to automatically repeat any sequence of slides from 1 slide to 27 slides with a 30 slide compartment magazine, or 1 slide to 36 slides with a 40 slide compartment magazine. The width of the accessory device when mounted on the magazine is equal to the width of 3 slide compartments in the 30 slide compartment magazine, and 4 slide compartments in the other magazine. It may be possible to reduce the width of the accessory device so that when mounted on the magazine, fewer slide compartments will be utilized by the device.

It is therefore one of the primary objects of this invention to provide an accessory device for a magazine partially filled with slides which is adapted to actuate the projector and cause its drive means to rapidly return the slide magazine to its original starting position after a particular sequence of slides in the magazine have been projected.

Another object of this invention is to provide and accessory device which is adapted to be used on magazines of different size.

Still another object of this invention is to provide accessory device for a slide magazine used in an automatic slide projector which is of simple design and construction, thoroughly reliable and efficient in operation, and economical to manufacture.

A further object of this invention is to provide an accessory device for a slide magazine used in an automatic slide projector that prevents the projector from picking an empty slide holder from the compartment adjacent to the slide holder having the last slide.

An additional object of this invention is to provide an accessory device mountable on a magazine used in an automatic projector and having one portion thereof insertable in the slide compartment adjacent to the last slide holder in the magazine and another portion adapted to actuate the projector for returning the magazine to its original starting position for reprojecting the same sequence of slides through the projector.

Objects and advantages other than those set forth above will be apparent from the following description when read in connection with the accompanying drawing, in which.

Figure 1:
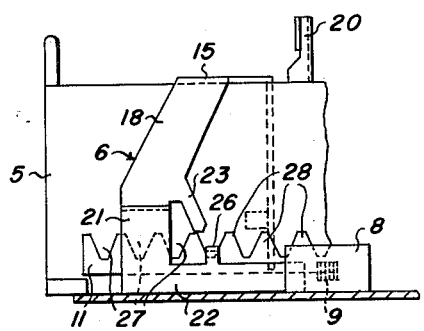
FIG. 1 is a side elevation view of a portion of a slide magazine and showing mounted thereon a preferred embodiment of the accessory device of this invention.
Figure 2:
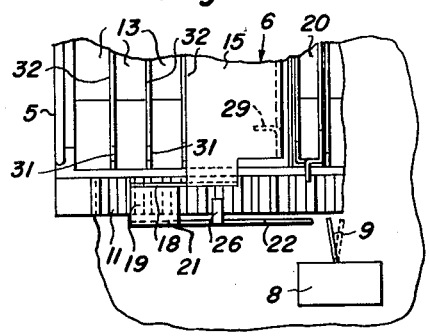
FIG. 2 is a segmental top plan view of the structure of FIG. 1.

As shown in the drawing, this invention relates to an accessory device 6 removably mounted on one of two slide magazines 5, 7. This accessory device 6 is of utility in connection with an automatic slide projector of the type disclosed and described in U.S. patent application Serial No. 696,516 by Herbert T. Robinson, Vernon H. Jungjohann and William P. Ewald, and another U.S. patent application which is being filed contemporaneously with this one by Herbert T. Robinson, one of the coinventors of the present invention. Slide magazine 5 is shown in FIGS. 1 and 2 and magazine 7 in FIGS. 3 and 4. Since the automatic slide projector and the mechanism for automatically returning the slide magazine to its original starting position is described in detail in the above-identified applications, the only reference made thereto will be in connection with the portion of the automatic slide projector that cooperates with accessory device 6 of this invention. This portion is a switch 8 as best seen in FIGS. 1 and 2 having an arm 9 extending into the path of and actuable by accessory device 6.

Figure 3:
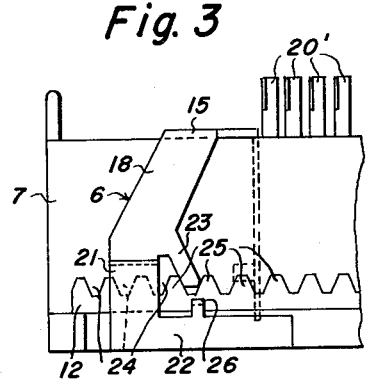
FIG. 3 is a view similar to FIG. 1 showing the accessory device on a different type of slide magazine.

The magazines 5, 7 are of substantially the same length, width, and height, but vary in their slide holding capacities, and also in the construction of their gear racks 11, 12 respectively. The magazine 5 as seen in FIGS. 1 and 2 has 30 slide-holding compartments 13, and its gear rack 11 has 30 teeth and is of a predetermined width. The magazine 7 shown in FIGS. 2 and 3 is provided with 40 slide holder compartments 14, and its gear rack has 40 teeth and is substantially one-half the width of gear rack 11.

Figure 4:
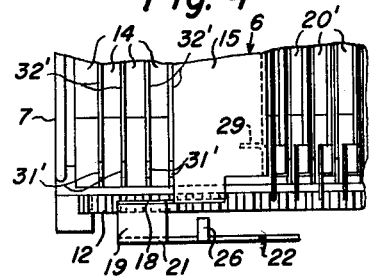
FIG. 4 is a segmental top plan view of the structure of FIG. 3.
Figure 5:
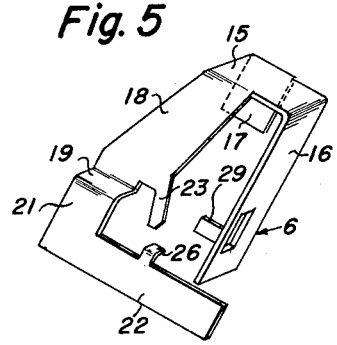
FIG. 5 is a perspective view of the accessory device of this invention.

The accessory device 6 as best shown in perspective in FIG. 5 comprises a top plate member 15 adapted to span one of the slide magazines 5, 7 and having a first depending portion 16 receivable by one of the compartments 13, 14 of the slide magazines 5, 7 respectively. The portion 16 is inserted in the compartment 13, 14 of each magazine adjacent the last slide holder 20, 20' respectively. Accordingly, plate 15 covers the compartment adjacent the last slide holder and prevents the projector mechanism from picking up an empty slide holder which might otherwise be in that compartment prior to returning the magazine to its original starting position. An empty slide holder picked up by the projector prior to its return would jam the projector when it is operated to reproject the slides. The plate 15 has parallel, spaced apart second and third depending portions 17, 18 respectively extending over opposite sides of the magazine involved, the distance therebetween being only slightly greater than the width of the magazine, thereby preventing undue movement of accessory device 6 in a direction transverse to the direction of movement of the magazine. The second and third depending portions 17, 18 lie in planes that are transverse to the plane in which first depending portion 16 lies. The third depending portion 18 has a right angle bend or offset 19 that terminates in another depending leg 21 having an arm 22 at right angles thereto. The leg 21 and arm 22 are substantially parallel to the second and third depending portions 17, 18. The third depending portion 18 further has an outwardly extending finger 23 extending into a groove 24 between two successive teeth 25 in gear rack 12 of magazine 7 as shown in FIG. 3. The finger 23 is inclined at an angle with one edge thereof substantially parallel to one side of tooth 25, and a corner of finger 23 substantially in engagement with the side of the adjacent tooth 25, thereby preventing any movement of accessory device 6 in the direction of magazine travel. The arm 22 has a turned lip 26 of narrow width which is completely disengaged from rack 12 as best seen in FIG. 4.

If the same device 6 is used with magazine 5 shown in FIGS. 1 and 2, the top plate 15 spans magazine 5 and bears upon the upper edge of the sides of magazine 5. The first depending portion 16 extends into slide compartment 14 adjacent the last slide holder 20 in magazine 5, and the second and third depending portions 17, 18 respectively extend over the sides of magazine 5 similar to the previously described device in connection with magazine 7. With magazine 5, lip 26 drops into one of the grooves 27 between two succeeding teeth 28 with its edges engaging the adjacent sides of teeth 28 for preventing any movement of accessory device 6 in the direction of travel of magazine 5. Since gear rack 11 is considerably lower than gear rack 12, finger 23 does not engage rack 12 or cooperate with it in any way as seen in FIG. 1.

In order to prevent the operator from mounting device 6 backwardly on the magazine, the depending portion 16 is provided with a lug 29, best seen in FIG. 5, struck out from portion 16. When device 6 is mounted correctly as seen in FIGS. 2 and 4, lug 29 does not interfere with ribs 31, 31' of U-shaped partitions 32, 32' respectively separating the slide compartments 13, 14 respectively. However, the ribs, not shown, on the other side of partitions 32, 32' are considerably wider than ribs 31, 31' so that any attempt by the operator to place device 6 on one of the magazines backwardly, that is with portion 18 extending over the side of the magazine which does not have the gear rack, is prevented by lug 29 striking the wider ribs.

The invention has been described in detail with particular reference to preferred embodiments thereof, but it will be understood that variations and modifications can be effected within the spirit and scope of the invention as described hereinabove and as defined in the appended claims.

We claim:

1. An accessory device for a reciprocally movable slide magazine having slide compartments and a gear rack and suitable for use in an automatic slide projector of the type having a control mechanism adapted when actuated to return the slide magazine to its original starting position, the combination comprising: a unitary member removably mounted on a partially filled slide magazine and having a first portion receivable by one of the slide compartments of said magazine, said member further having a second portion for actuating said control mechanism upon advancement of said slide magazine to a position determined by the mounting of said unitary member, and a third portion cooperating with said gear rack for substantially preventing movement of said second portion with respect to said magazine in either direction of magazine travel.

2. The invention according to claim 1 wherein said third portion is provided by said second portion.

3. The invention according to claim 1 wherein said unitary member has a plate member extending across the top of said magazine.

4. The invention according to claim 3 wherein said first portion comprises a substantially rectangular plate element depending from said plate member.

5. The invention according to claim 1 wherein said unitary member has a plate member extending across the top of said magazine, said first portion comprises a substantially rectangular plate element depending from said plate member, said second portion comprises a substantially L-shaped plate element depending from said plate member, and said third portion comprises a projection provided by said second portion and receivable by one of the grooves of said gear rack.

6. The invention according to claim 5 wherein said L-shaped plate element of said second portion has a first part parallel with and adjacent to one of the sides of said magazine, a second offset part transverse to said first part, and a third part parallel to said first part and spaced apart therefrom by the width of said second offset part, said third part further having one end adapted to actuate said control mechanism.

7. The invention according to claim 6 wherein said first and third parts of said second portion lie in planes that are transverse to a plane in which said first portion is located.

8. The invention according to claim 6 wherein said projection is provided by one of said first and third parts.

9. The invention according to claim 5 wherein said plate member further has a depending leg parallel to and spaced from said L-shaped plate element a distance greater than the width of said magazine.

10. The invention according to claim 5 wherein said rectangularly shaped plate element of said first portion is provided with a lug cooperating with said magazine whereby said unitary member cen be mounted on said magazine in only one correct position.

No references cited.